(12) United States Patent
Ekström

(10) Patent No.: US 6,684,841 B2
(45) Date of Patent: Feb. 3, 2004

(54) VACUUM BOOST APPARATUS

(75) Inventor: Kenneth Ingemar Ekström, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 10/008,474

(22) Filed: Dec. 6, 2001

(65) Prior Publication Data

US 2002/0088420 A1 Jul. 11, 2002

(30) Foreign Application Priority Data

Dec. 7, 2000 (EP) .............................. 00126836

(51) Int. Cl.[7] .............................................. F02M 35/10
(52) U.S. Cl. ............................ 123/184.21; 123/184.53; 123/184.54
(58) Field of Search ..................... 123/184.21, 184.53, 123/184.54; 137/115.14, 526, 493, 510

(56) References Cited

U.S. PATENT DOCUMENTS 4,422,293 A * 12/1983 Ewald .......................... 74/594
5,676,101 A * 10/1997 Kawai et al. ............ 123/179.18

FOREIGN PATENT DOCUMENTS

| DE | 198 53 050 A1 | 11/1998 |
| EP | 0 549086 A1 | 6/1993 |
| JP | 11247679 | 9/1999 |

* cited by examiner

Primary Examiner—Tony M. Argenbright
Assistant Examiner—Katrina B. Harris
(74) Attorney, Agent, or Firm—Carlos L. Hanze

(57) ABSTRACT

The invention relates to a device for improving the vacuum in an auxiliary device. The auxiliary device uses vacuum for one or more applications in a vehicle. The auxiliary device is connected to the inlet manifold of a vehicle via a duct having a one-way valve directing the flow from the auxiliary device to the inlet manifold. The device comprises a chamber having an inlet duct connected to said auxiliary device and an outlet duct. Each of said inlet and outlet ducts have a one-way valve. The chamber is separated from the inlet manifold via a flexible member.

15 Claims, 4 Drawing Sheets

VACUUM BOOST APPARATUS

BACKGROUND OF THE INVENTION

1. Field of the Invention

The invention relates to a device for improving the vacuum in an auxiliary device of a motor vehicle. The auxiliary device uses vacuum for various applications. Such an auxiliary device is often connected to the inlet manifold of a vehicle via a duct having a one-way valve directing the flow from the auxiliary device to the inlet manifold.

2. Background Information

Modern vehicles utilize vacuums formed in engine inlet manifolds for brake servo and other applications, such as central locking systems and climate control systems. However, at certain occasions the brake performance is low due to insufficient vacuum levels. The issue is accentuated, for example, during cold starts, at high altitudes and when driving on serpentine roads, alternately accelerating and braking. Fluctuating vacuum levels become more perceptible with additional auxiliary devices on the engine, automatic gearboxes, servo assisted steering, climate systems and exhaust emission systems. Variable valve timing and variable ignition timing can also make the vacuum variations more perceptible.

To increase the vacuum when, for example, starting a vehicle at high altitude having an automatic gearbox, a separate vacuum pump could be used. EP-A1-0549086 for example discloses a pump that has a housing, which has an upper and a lower flange between which is tightened a diaphragm, which is moved via a connecting rod and a shaft. The pump has an inlet and an outlet in which a control valve is arranged. A sealing ring is firmly connected to the lower flange of the pump and forms an apron with a cylindrical outer surface. A cover hood is set over the upper part of the pump, which has a cylindrical inner wall section fitting over the outer surface of the sealing ring, leaving a gap which is impenetrable to flame. The pump inlet and outlet are in flow connection via a seal with a suction connecting duct and a pressure-connecting duct through the covering hood.

Further, DE-A1-19853050 discloses a vacuum pump that has a working chamber for connection to a vacuum chamber of a vacuum braking pressure device amplifier and an outlet valve leading to ambient atmosphere. A membrane forming a boundary wall of the working chamber can be deflected in a working direction. An actuator coupled to the membrane contains an armature that can be moved in the working direction of the membrane by an electromagnetic coil.

The disadvantage with vacuum pumps in prior art is that they all require additional power, which at the above-mentioned conditions can be difficult.

SUMMARY OF THE INVENTION

A first non-limiting object of the present invention is to provide a device, which utilizes the pressure pulses in the inlet manifold of a vehicle to increase the vacuum in an auxiliary device, such as a brake servo/brake booster. A further object of the present invention is to provide a simple and non-expensive device for boosting vacuum levels for vehicle auxiliary devices.

Accordingly, the invention utilizes a chamber having an inlet and an outlet duct. The inlet duct is connected to a vacuum chamber of an auxiliary device. The chamber is separated from the inlet manifold with a flexible member. When the pressure in the inlet manifold decreases, the flexible member is drawn into the inlet manifold, thereby increasing the volume of the chamber. The pressure decreases in the chamber and a one-way valve arranged in the inlet duct opens and thus creating a flow from the vacuum chamber of the auxiliary device. Next the pressure in the inlet manifold increases and the flexible member of the device is pushed back into the chamber and the pressure increases in the chamber. At this point a valve in the outlet duct of the chamber opens and the system reaches equilibrium. This cycle is repeated and this increases the vacuum in the vacuum chamber of the auxiliary device.

Further advantages, objects and features of the invention will become apparent from the following detailed description of the invention taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein.

The figures are simplified and show the present invention schematically in order to facilitate the understanding.

DETAILED DESCRIPTION OF THE PREFERRED EMBODIMENTS

Figure 1:
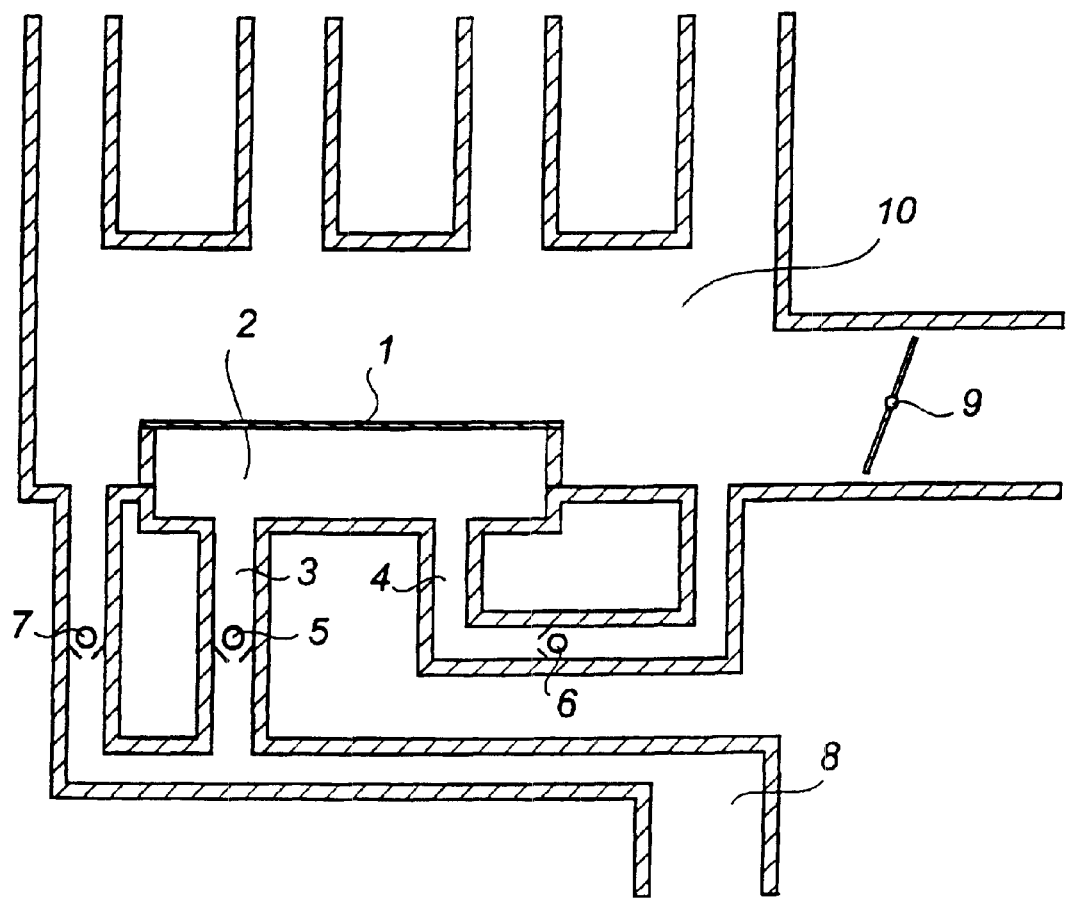
FIG. 1 shows a schematic view of the present invention with an outlet duct directed to an inlet manifold.

The device according to FIG. 1 comprises a flexible member 1 and a chamber 2. The chamber has an inlet duct 3 with a one-way valve 5. Further, there is an outlet duct 4 with a one-way valve 6. The inlet duct 3 is connected to the vacuum chamber 8 of an auxiliary device. The chamber 2 is separated from the inlet manifold 10 with the flexible member 1. When the pressure in the inlet manifold 10 decreases the flexible member 1 is drawn inwards the inlet manifold 10, thereby increasing the volume of the chamber 2. The pressure decreases in the chamber 2 and the one-way valve 5 arranged in the inlet duct 3 opens and this creates a flow from the vacuum chamber 8 of the auxiliary device. Next the pressure in the inlet manifold 10 increases and the flexible member 1 of the device is pushed back into the chamber 2 and the pressure increases in the chamber 2. At this point the one-way valve 6 in the outlet duct of the chamber 2 opens and the system reaches equilibrium. This cycle is repeated and this increases the vacuum in the vacuum chamber 8 of the auxiliary device. A one-way valve 7 is preferably arranged between the inlet manifold 10 and the vacuum chamber 8 of the auxiliary device in order to maximize the vacuum in the vacuum chamber 8.

The working pressure of the inlet manifold 10 is normally below atmospheric pressure. To facilitate the release of pressure from the outlet duct 4 of the chamber 2, said duct 6 is connected to the inlet manifold 10, see FIG. 1. When, as in this example, the pressure of the inlet manifold 10 is lower than the atmospheric pressure the one-way valve 6 in the outlet duct 4 more easily opens to release the pressure. An alternative to directing the outlet duct in to the inlet manifold is to make a connection just before (not shown) the throttle 9 in the hose in order to have a more constant resistance.

Figure 2:
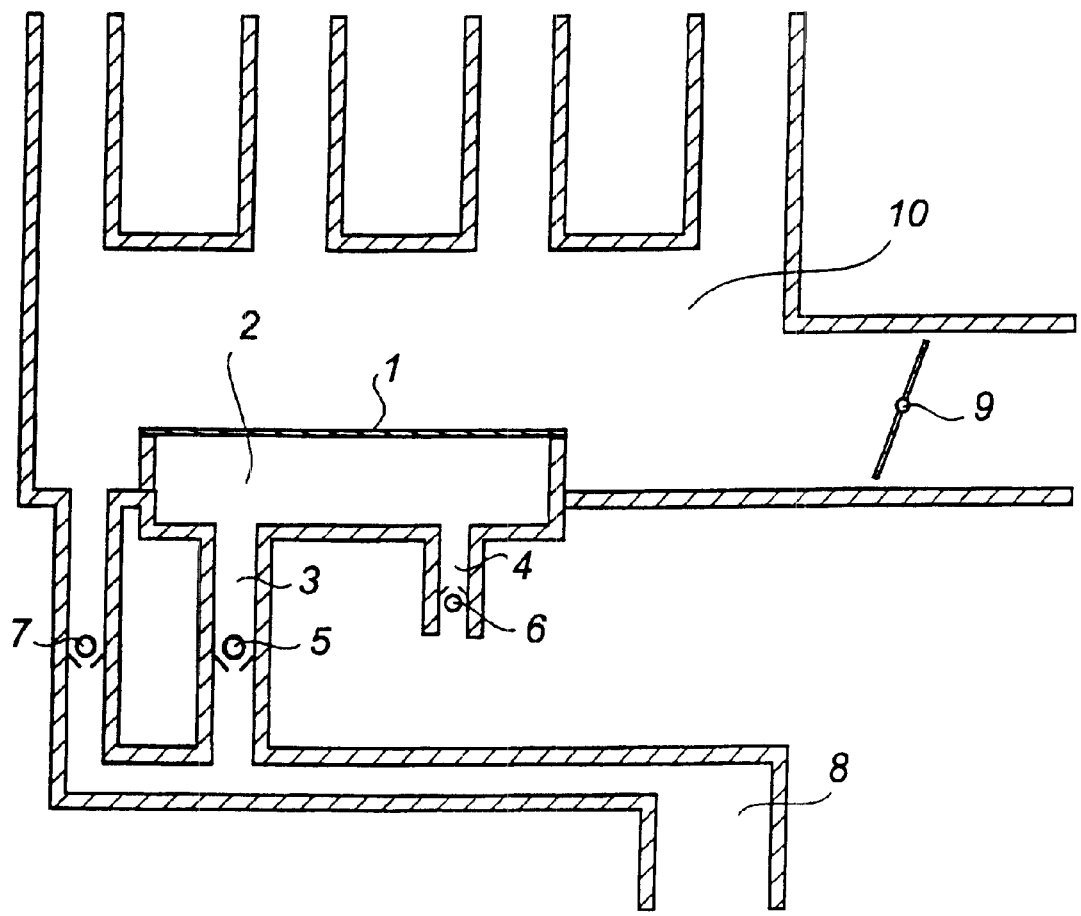
FIG. 2 shows a schematic view of the present invention with an outlet duct directed to ambient air.

Under special circumstances the pressure in the inlet manifold 10 is higher than the atmospheric pressure. This situation can occur with a turbo charged engine or when the throttle opening is large. Alternatively, as shown in FIG. 2, the outlet duct 4 is directed to ambient air in order to release the pressure from the chamber 2. This facilitates the opening of the one-way valve 6 in the outlet duct 4 since the atmospheric pressure in this case is lower than the pressure in the inlet manifold 10.

Figure 3:
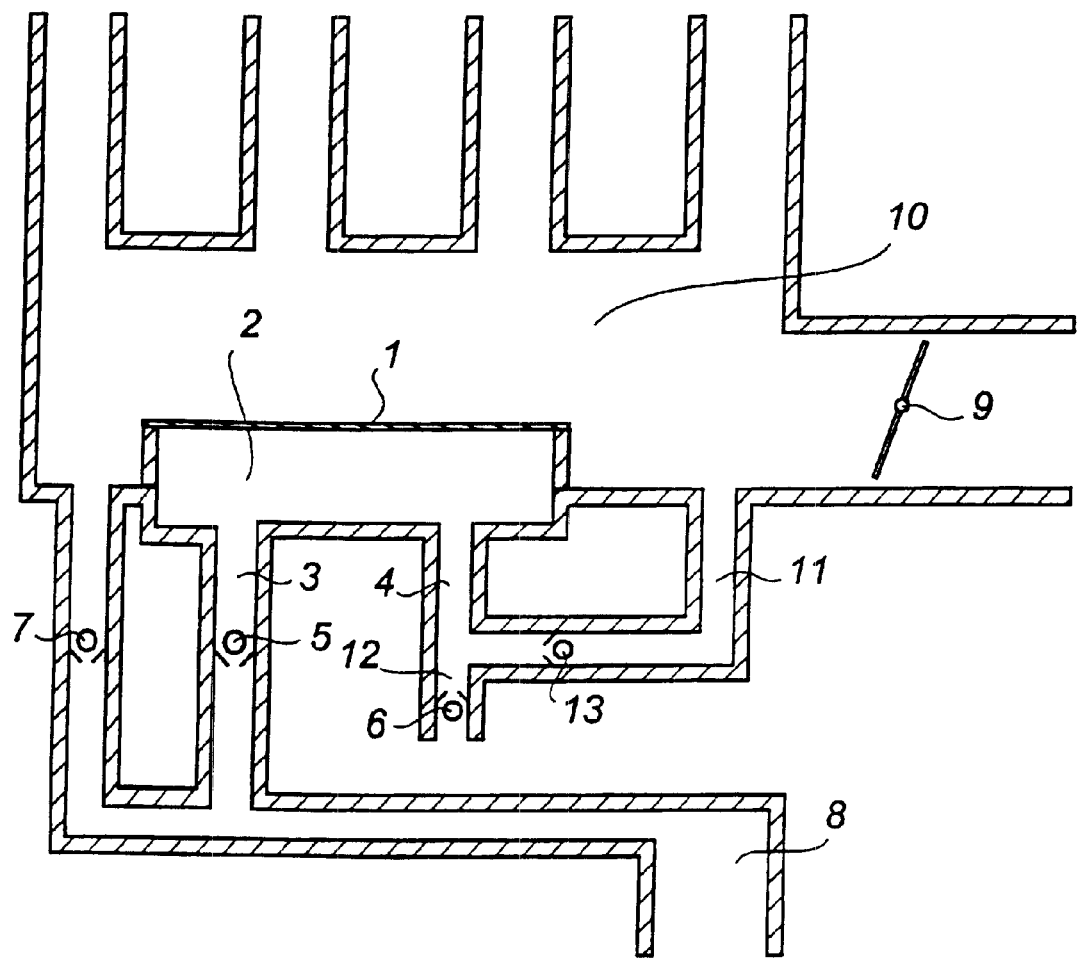
FIG. 3 shows a schematic view of the present invention with two outlet ducts.

FIG. 3 shows a further alternative where the chamber has two outlet ducts 11, 12 or to divide the one duct 4 into two ducts. One of the two outlet ducts is connected to the ambient air and the other of the two ducts is connected to the inlet manifold 10. In this way the pressure in the chamber is released through one of the ducts depending on the situation. If the pressure in the inlet manifold 10 is higher than the atmospheric pressure, the pressure in the chamber 2 will be released through the duct 12 leading to the ambient air and the one-way valve 6 will open. Contrary, if the pressure in the inlet manifold 10 is lower than the atmospheric pressure, the pressure in the chamber 2 will be released through the duct 11 leading to the inlet manifold 10 and the one-way valve 13 will open.

The auxiliary device is preferably a brake booster and the present invention is mainly a security arrangement to ensure sufficient vacuum for efficient brake action. The device can of course be used for other applications utilizing the vacuum in the inlet manifold 10. For example, the device could be used for EGR (exhaust gas recirculation).

In a preferred embodiment of the present invention the flexible member 1 is a membrane or a diaphragm. The membrane is preferably light and fast in order for the membrane to oscillate corresponding to the frequency of the pressure pulses. The membrane is preferably manufactured in an elastic airtight material. If needed, the membrane can be manufactured with a built in tension, an offset. It is not necessary that the entire membrane is elastic. For example, the membrane can consist of a rigid plate with elastic material along the edges attaching the membrane to the device and thereby allowing the membrane (plate) to oscillate.

In another preferred embodiment of the present invention the flexible member 1 is a piston-like device. The piston should in this case be arranged in an airtight manner and also made of lightweight material, but still able of transmitting a pressure.

In a preferred embodiment of the present invention the chamber 2 with the flexible member 1 is located inside the inlet manifold 10.

In an alternative embodiment of the present invention the chamber 2 with the flexible member 1 is located outside the inlet manifold 10. However the connection between the device and the inlet manifold 10 preferably has very low pressure drop between said device and inlet manifold 10 since the flexible member oscillates with the frequency of the pressure pulses. A pressure drop results in lower amplitude of the pressure variations when the pulses reach the flexible member 1 of the device.

Figure 4:
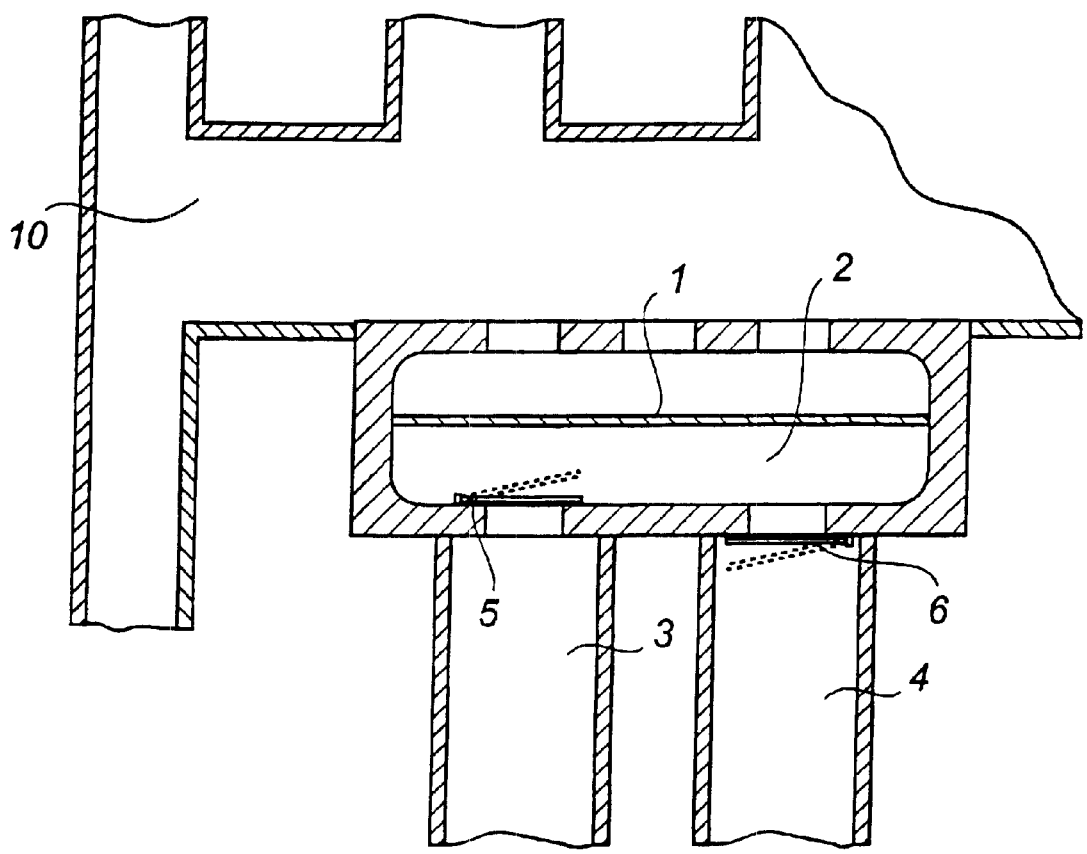
FIG. 4 shows a schematic cross-sectional view of the device according an alternative embodiment of the present invention.

In a further preferred embodiment of the present invention the chamber 2 is provided in a recess of the inner surface of the inlet manifold 10, see FIG. 4. The chamber 2 with the flexible member could be either built in as a part of the inlet manifold 10 or provided in the recess as a separate unit.

One-way valves 5, 6, 7, and 13 are preferably fast, since they are opening and closing with the frequency of the flexible member 1 and the pressure pulses.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. An apparatus for boosting a vacuum in an auxiliary device of a motor vehicle, the auxiliary device being coupled to an inlet manifold of an internal combustion engine of the vehicle, the apparatus comprising:

a chamber separated from the inlet manifold via a flexible member, said flexible member allowing the volume of said chamber to vary in accordance with air pressure within the inlet manifold;

a chamber inlet duct connecting said chamber to the auxiliary device for allowing air flow into said chamber when the air pressure within the inlet manifold decreases; and a chamber outlet duct extending from said chamber for allowing air flow from said chamber when the air pressure within the inlet manifold increases.

2. The apparatus according to claim 1, wherein said outlet duct is connected to the inlet manifold.

3. The apparatus according to claim 1, wherein said outlet duct is directed to ambient air.

4. The apparatus according to claim 1, wherein said outlet duct comprises:

a first portion directed to ambient air; and a second portion connected to the inlet manifold.

5. The apparatus according to claim 1, wherein the auxiliary device is a brake booster.

6. The apparatus according to claim 1, wherein said flexible member is an elastic airtight membrane.

7. The apparatus according to claim 1, wherein said chamber is disposed inside the inlet manifold.

8. The apparatus according to claim 1, wherein said chamber is disposed outside the inlet manifold.

9. A method of boosting vacuum in an auxiliary device of a motor vehicle, the auxiliary device being coupled to an inlet manifold of an internal combustion engine of the vehicle, the method comprising:

storing a vacuum in a variable volume chamber separated from the inlet manifold when air pressure within the within the inlet manifold decreases, the chamber being separated from the inlet manifold via a flexible member, the flexible member allowing the volume of said chamber to vary in accordance with air pressure within the inlet manifold; and releasing the stored vacuum from the chamber when the air pressure within the inlet manifold increases.

10. The method according to claim 9, wherein said releasing step comprises releasing the stored vacuum back into the inlet manifold.

11. The method according to claim 9, wherein said releasing step comprises releasing the stored vacuum to ambient air.

12. The method according to claim 9, wherein the auxiliary device is a brake booster.

13. The method according to claim 9, wherein the flexible member is an elastic airtight membrane.

14. The method according to claim 9, wherein the chamber is disposed inside the inlet manifold.

15. The method according to claim 9, wherein the chamber is disposed outside the inlet manifold.

* * * * *